US011995116B2

(12) United States Patent
Jorgensen et al.

(10) Patent No.: US 11,995,116 B2
(45) Date of Patent: May 28, 2024

(54) MULTI-USER CONTENT QUEUE

(71) Applicant: Apple Inc., Cupertino, CA (US)

(72) Inventors: Cody D. Jorgensen, San Jose, CA (US); Edward T. Schmidt, Burlingame, CA (US); Jason P. Ketterman, San Jose, CA (US); Michael Gachet, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/064,462

(22) Filed: Oct. 6, 2020

(65) Prior Publication Data

US 2021/0124772 A1    Apr. 29, 2021

Related U.S. Application Data

(60) Provisional application No. 62/926,561, filed on Oct. 27, 2019.

(51) Int. Cl.
*G06F 16/43*      (2019.01)
*G06F 16/435*     (2019.01)
(Continued)

(52) U.S. Cl.
CPC ........ *G06F 16/435* (2019.01); *G06F 16/4387* (2019.01); *G06F 16/9535* (2019.01)

(58) Field of Classification Search
CPC ............... G06F 16/435; G06F 16/4387; G06F 16/9535; H04L 63/102
See application file for complete search history.

(56) References Cited

U.S. PATENT DOCUMENTS 9,147,054 B1 *   9/2015  Beal ............... G06F 16/635
10,511,685 B2 * 12/2019  Kumar ............ G06F 16/437
(Continued)

FOREIGN PATENT DOCUMENTS

CN    102694839 A    9/2012
CN    104410914      3/2015
(Continued)

OTHER PUBLICATIONS

Extended European Search Report from European Patent Application No. 20203895.6, dated Mar. 22, 2021, 10 pages.
(Continued)

*Primary Examiner* — Son T Hoang
(74) *Attorney, Agent, or Firm* — BAKERHOSTETLER

(57) ABSTRACT

A device implementing a multi-user content queue may include a memory and at least one processor configured to receive, on the device, a content query and retrieve, from the memory, user account credentials corresponding to user accounts associated with the device. The at least one processor may be further configured to provide, to a server, the user account credentials and the content query. The at least one processor may be further configured to receive, from the server and based on the content query, a user account identifier of one of the user accounts and a content identifier corresponding to content in a content library of the one of the user accounts. The at least one processor may be further configured to utilize the user account identifier and the content identifier for output, by the device, of the content from the content library of the one of the user accounts.

20 Claims, 8 Drawing Sheets

(51) Int. Cl.
    *G06F 16/438*       (2019.01)
    *G06F 16/95*        (2019.01)
    *G06F 16/9535*      (2019.01)

(56) References Cited

U.S. PATENT DOCUMENTS

| | | |
|---|---|---|
| 2002/0184180 A1 | 12/2002 | Debique et al. |
| 2004/0088174 A1* | 5/2004 | Agrawal ................. G06F 16/48 |
| 2011/0207440 A1* | 8/2011 | Ruuspakka ........... G06F 16/435 |
| 2012/0089910 A1 | 4/2012 | Cassidy |
| 2012/0110119 A1 | 5/2012 | Levicki et al. |
| 2012/0233120 A1* | 9/2012 | Nijim .................... G06F 16/735 707/626 |
| 2013/0191454 A1* | 7/2013 | Oliver ................... G06F 16/639 |
| 2013/0254314 A1* | 9/2013 | Chow .................... G06F 16/957 709/206 |
| 2013/0347117 A1 | 12/2013 | Parks et al. |
| 2014/0081871 A1 | 3/2014 | Kidron |
| 2014/0122564 A1* | 5/2014 | Arora ................. H04L 65/4084 709/203 |
| 2014/0282666 A1 | 9/2014 | Comstock et al. |
| 2015/0106887 A1* | 4/2015 | Aslund .................... G06F 16/48 |
| 2016/0085499 A1 | 3/2016 | Corbin et al. |
| 2017/0054826 A1 | 2/2017 | Kumar et al. |
| 2017/0301353 A1* | 10/2017 | Mozer ..................... G10L 17/04 |
| 2018/0060320 A1* | 3/2018 | Oganian ............... G06Q 20/403 |
| 2019/0005513 A1* | 1/2019 | Bennett .............. G06F 16/9535 |
| 2019/0124049 A1 | 4/2019 | Bradley et al. |
| 2019/0141398 A1 | 5/2019 | Auxer et al. |
| 2019/0147059 A1 | 5/2019 | Lu et al. |
| 2019/0207949 A1* | 7/2019 | Parker ................... G06Q 20/306 |
| 2019/0318069 A1 | 10/2019 | Mitic et al. |
| 2020/0218760 A1 | 7/2020 | Su et al. |

FOREIGN PATENT DOCUMENTS

| | | |
|---|---|---|
| CN | 107943877 | 4/2018 |
| CN | 108369583 | 8/2018 |
| CN | 108882158 | 11/2018 |
| CN | 109740016 | 5/2019 |
| CN | 109934580 A | 6/2019 |
| WO | WO 2017/142612 | 8/2017 |
| WO | WO 2018/213004 | 11/2018 |

OTHER PUBLICATIONS

European Office Action from European Patent Application No. 20203895.6, dated Jun. 21, 2022, 7 pages.

Jiajun, et al., "Design of music player based on cloud technology," China Academic Journal Electronic Publishing House, 2012, 4 pages with English language abstract.

Li, et al., "Detecting Changes in: User-Centered Music Query Streams," IEEE ICME 2006, pp. 1977-1980.

Chinese Office Action from Chinese Patent Application No. 202011153830.X, dated Sep. 28, 2022, 26 pages including English language translation.

Ngo, et al., "Combining Named Entities with WordNet and Using Query-Oriented Spreading Activation for Semantic Text Search," 2010 IEEE Rivf International Conference on Computing and Communications Technologies, Research, Innovation and Vision of the Future (RIVF), Nov. 2010, 6 pages.

Chinese Notification to Grant Patent from Chinese Patent Application No. 202011153830.X, dated Jun. 19, 2023, 8 pages including English language translation.

European Intention to Grant from European Patent Application No. 20203895.6, dated Jun. 5, 2023, 8 pages.

* cited by examiner

MULTI-USER CONTENT QUEUE

CROSS REFERENCE TO RELATED APPLICATIONS

This application claims the benefit of priority to U.S. Provisional Patent Application No. 62/926,561, entitled "Multi-User Content Queue," filed on Oct. 27, 2019, the disclosure of each of which is hereby incorporated herein in its entirety for all purposes.

TECHNICAL FIELD

The present description relates generally to output of content on multi-user devices, including output of content from a multi-user content queue on a multi-user device.

BACKGROUND

Playlists, or content queues, may be used by content output devices, such as smart speakers, to queue and output multiple content items that are authorized for playback by a single user account.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
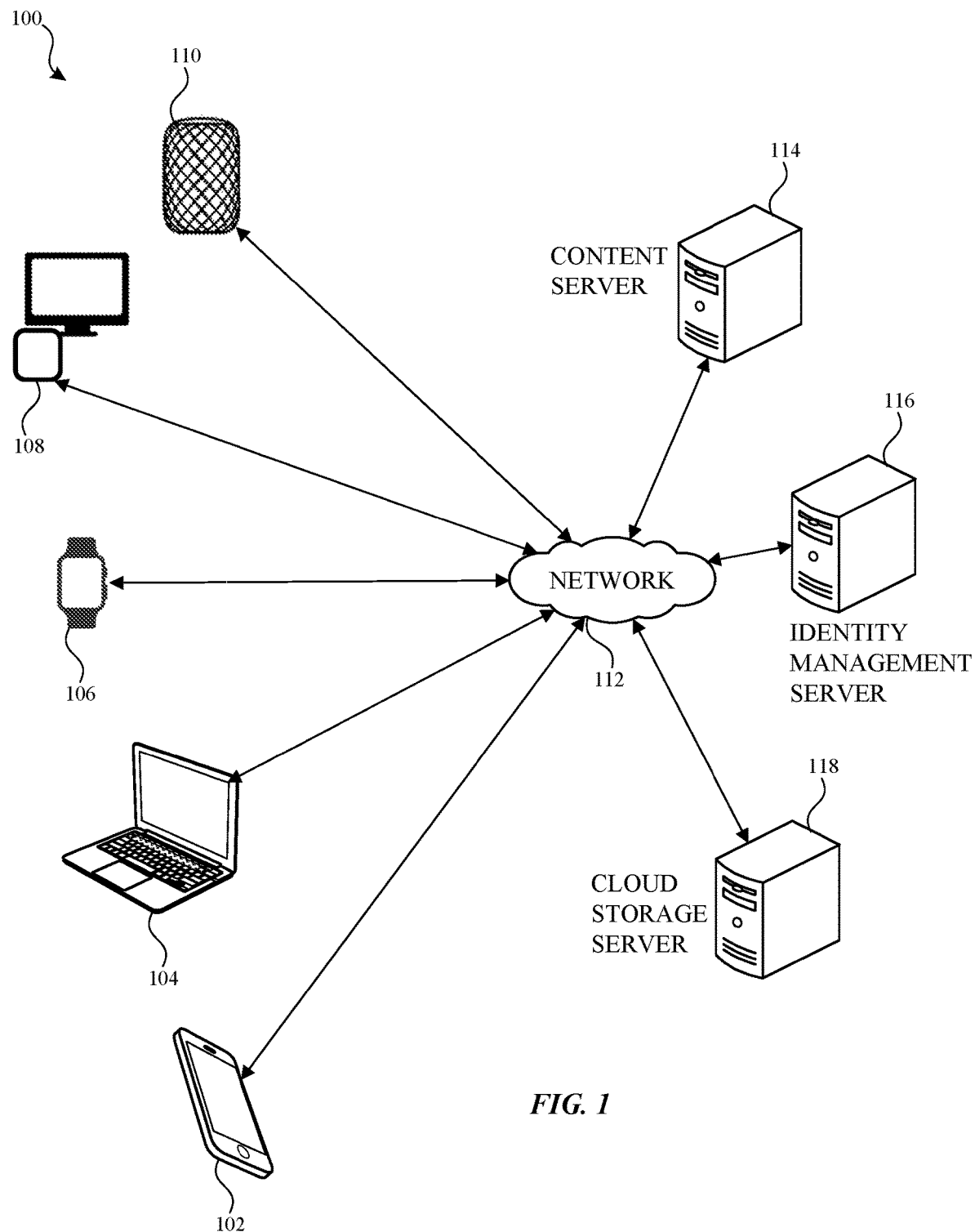
FIG. 1 illustrates an example network environment for providing a multi-user content queue in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A household may have multiple users that may each wish to use one or more content output devices, such as a smart speaker. However, content output devices may restrict content access to the library of a single user, e.g., in general and/or at a time. In this regard, other users of a household may be unable to add content from their libraries to an existing or currently playing playlist. The subject system provides for multi-user content queues that may contain queue entries corresponding to content from content libraries of different users. In this manner, a single unified content queue can be utilized that includes content from the content library of any member of the household without requiring changing the primary account, generating separate per-user playlists, or other cumbersome processes.

For example, a content output device may store a content library information corresponding to the content library of each user account registered with the content output device, as well as user account credentials, or tokens, for each registered user account. The content output device may maintain a multi-user content queue with queue entries for content to be played, where the queue entries may include references to content in the content libraries of one or more of the registered user accounts. When content of a particular queue entry is to be output, the user account credential of the associated user account is utilized to authenticate playback of the content.

In addition, requests to control the multi-user content queue can be optionally associated with a specific user to affect only that user's content preference profile, e.g., most recently played, etc., such as when the specific user requested the content and the content is being played from the specific user's content library. Multi-user content queues may also be used to update user playlists, for example by adding a currently playing song to a user's own playlist. Further, multi-user content queues may be transferred from one content output device to another content output device (e.g., multi-user or single user), and the multi-user content queues may gracefully degrade depending on the authorization rights present on the newly transferred content output device.

FIG. 1 illustrates an example network environment 100 for providing a multi-user content queue in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), a media content server 114, an identity management server 116 and a cloud storage server 118 (hereinafter "the servers 114-118"), and a network 112. The network 112 may communicatively (directly or indirectly) couple, for example, any two or more of the electronic devices 102-110 and/or the servers 114-118. In one or more implementations, the network 112 may be an interconnected network of devices that may include, and/or may be communicatively coupled to, the Internet. In one or more implementations, the network 112 may correspond to a local area network (e.g., a WiFi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a smart speaker. By way of example, the electronic device 108 is depicted as a digital media player (e.g., configured to receive digital data such as music and/or video and stream it to a television or other video display). In one or more implementations, the electronic device 108 may be integrated into the display device. In one or more implementations, one or more of the electronic devices 102-110 may be referred to as a content output device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the content server 114 may be configured to provide content (e.g., via streaming and/or download) for output on a device (e.g., one or more of the electronic devices 102-110). The identity management server 116 may be configured to verify and/or manage user account identifiers (IDs) associated with user accounts and/or devices. The cloud storage server 118 may be configured to store data (e.g., files such as documents and/or photos) associated with user accounts for download on user devices, to share and/or send data to other users, and/or to back-up (e.g., wirelessly) device data.

Moreover, in one or more implementations, users may have user accounts that are managed by the identity management server 116, and the user accounts may be associated with content libraries (e.g., music and/or video content) provided by the content server 114. The content libraries may include, for example, subscription based content, purchased content (e.g., that is not available through a subscription), user-uploaded and/or generated content (such as user-created music or music transferred by a user from a compact disc), and/or user-generated playlists.

For example, the cloud storage server 118 may include custom user playlists and user provided and/or generated content that is separate from the content stored in the content server 114. The user provided and/or generated content may include music extracted from physical media that is stored in cloud storage, and/or content that is no longer available from the content server 114.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers. For example, the content server 114 may represent one or more voice assistant server(s) that are in communication with one or more separate content server(s). In one or more implementations, communications between the one or more voice assistant server(s) and one or more of the electronic devices 102-110 may be anonymous.

In one or more implementations, one or more of the electronic devices 102-110 may be configured to be associated with and/or registered with, multiple user accounts, such as with the identity management server 116. One or more of the electronic devices 102-110, such as the electronic devices 108, 110, configured to be associated with and/or registered with multiple user accounts may be referred to as multi-user devices, while one or more of the electronic devices 102-110, such as the electronic devices 102, 104, 106, configured to be associated with and/or registered with one user account may be referred to as a single user device. In one or more implementations, each of the electronic devices 102-110 may be configured to access the content libraries of the one or more users accounts that are registered with and/or associated with each of the electronic devices 102-110.

Figure 2:
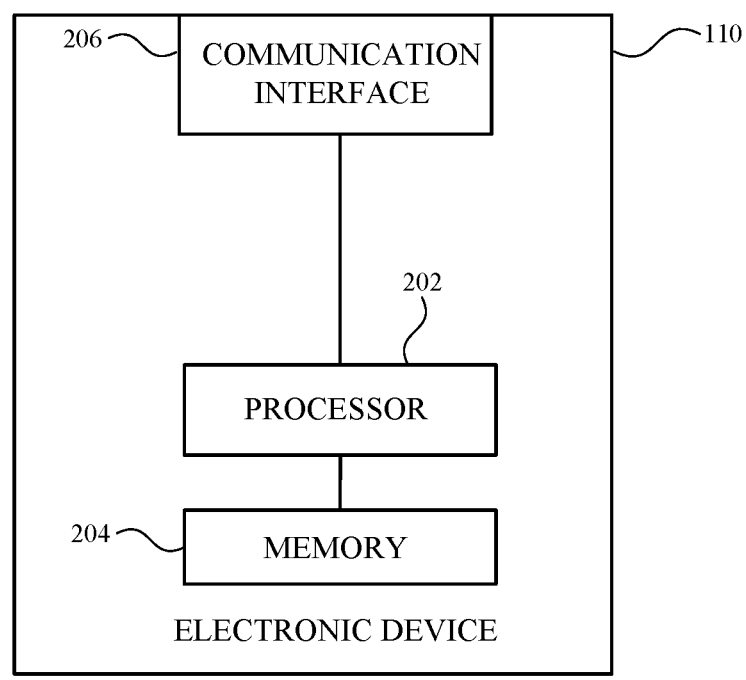
FIG. 2 illustrates an example electronic device that may implement a multi-user content queue in accordance with one or more implementations.

FIG. 2 illustrates an example electronic device 110 that may implement a multi-user content queue in accordance with one or more implementations. For explanatory purposes, FIG. 2 is primarily described herein with reference to the electronic device 110 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 110 may include a processor 202, a memory 204, and a communication interface 206. The processor 202 may include suitable logic, circuitry, and/or code that enable processing data and/or controlling operations of the electronic device 110. In this regard, the processor 202 may be enabled to provide control signals to various other components of the electronic device 110. The processor 202 may also control transfers of data between various portions of the electronic device 110. Additionally, the processor 202 may enable implementation of an operating system or otherwise execute code to manage operations of the electronic device 110.

The memory 204 may include suitable logic, circuitry, and/or code that enable storage of various types of information such as received data, generated data, code, and/or configuration information. For example, the memory may store one or more user account credentials associated with one or more user accounts registered with the electronic device 110, and/or content library information associated with the one or more user accounts, as is discussed further below with respect to FIG. 3. The memory 204 may include, for example, random access memory (RAM), read-only memory (ROM), flash, and/or magnetic storage.

In one or more implementations, the memory 204 may store one or more content output applications for outputting content via the electronic device 110. Examples of such applications, include but are not limited to, a music playback application.

The communication interface 206 may include suitable logic, circuitry, and/or code that enables wired or wireless communication, such as between any of the electronic devices 102-110 and one of more of the servers 114-118 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
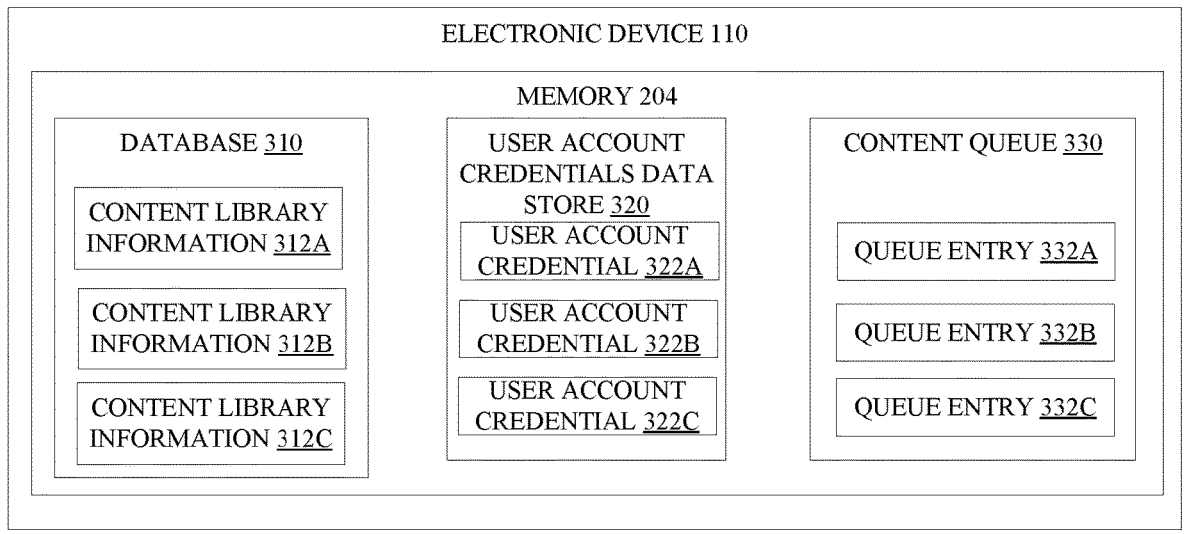
FIG. 3 illustrates an example electronic device implementing a multi-user content queue in accordance with one or more implementations.

FIG. 3 illustrates an example electronic device 110 implementing a multi-user content queue in accordance with one or more implementations. As shown in FIG. 3, the electronic device 110 may include a database 310, user account credentials data store 320, and a content queue 330, which may be stored in, for example memory 204 as shown in FIG. 2. The database 310 may store content library information 312A-C, the user account credentials data store 320 may store user account credentials 322A-C. The content queue 330 may include queue entries 332A-C.

In one or more implementations, the electronic device 110 may be used in a multi-user home environment that includes, for example, three users. By proceeding through a user onboarding process that may be guided by interfaces provided on e.g. electronic devices 102-110, the three users may respectively authorize user account credentials 322A, 322B, and 322C to be stored within the user account credentials data store 320 of the electronic device 110. The user account credentials 322A-C may, for example, be received from the identity management server 116 to access content stored on the content server 114 and/or the cloud storage server 118.

In one or more implementations, one or more of the user account credentials 322A-C may include one or more of a user account identifier, a user account password, a cryptographic token (such as an access token), or generally any information that may be used to authenticate the user accounts of the users with, e.g., the content server 114. For example, an access token may include information that identifies a user account, such as at least a portion of a user account identifier, and the access token may be signed by a private key of the content server 114. In one or more implementations, the user account credentials 322A-C may be used to retrieve access credentials, such as from the cloud storage server 118, and the access credentials may be used to access the corresponding content libraries via the content server 114.

The database 310 may store content library information 312A-C corresponding to the content libraries of the user accounts registered with the electronic device 110. For example, each of the content library information 312A-C may include metadata, including network identifiers that provide a reference, or link, to each content item in the corresponding content library. The network identifiers may refer to content provided by the content server 114, and/or user provided and/or generated content that may be stored on the cloud storage server 118. The metadata may further include a content identifier corresponding to each content item as well as descriptive information corresponding to each content item, such as a track name, an artist name, an album name, and the like. In one or more implementations, the content library information 312A-C may be downloaded to the electronic device 110 at the time that the user accounts are registered with the electronic device 110.

In one or more implementations, the content identifier corresponding to a given content item in the content library information 312A may differ from the content identifier corresponding to the same given content information in the content library information 312B. Thus, the content identifiers may be specific to each of the individual content library information 312A-C.

Once a user account is registered with the electronic device 110, and the corresponding content library information is downloaded to the electronic device 110, the electronic device 110 may receive a notification when the content library associated with the user account changes and/or is updated. The electronic device 110 may responsively retrieve updated content library information corresponding to the updated content library and may store the updated content library information in the database 310. In this manner, the electronic device 110 may continuously maintain/update the content library information 312A-C. In one or more implementations, the electronic device 110 may request (e.g., pull) any updates to a particular content library information, such as the content library information 312A, when switching to the content library information 312A from another of the content library information 312B-C.

The content queue 330 may comprise a list of queue entries 332A-C, where each queue entry may include a user account identifier identifying a user account registered with the electronic device 110 (and/or an identifier of/link to the corresponding user account credential), and a content identifier corresponding to a particular content item in the content library corresponding to the user account. In one or more implementations, one or more of the queue entries 332A-C, such as the queue entry 332A, may further include a requesting user account identifier corresponding to the user account of the user who requested to have the queue entry 332A added to the content queue 330.

In one or more implementations, a user account may be delegated to the electronic device 110 where the content library information corresponding to the user account is not stored on the electronic device 110, but a user account credential for accessing, or temporarily accessing, at least a portion of the content library of the user account is stored on the electronic device 110. For example, an electronic device 102 of a guest may temporarily grant access to the guest's content library to the electronic device 110. In this example, the queue entry for content added from the guest's content library may include a network identifier for accessing the content, such as from the content server 114, as well as an account identifier of the guest's user account (and/or other information for accessing the user account credential for accessing the guest's content library).

The electronic device 110 may playback the content in the content queue 330 in a sequential and/or shuffled order. In comparison to a playlist that is limited to content of the content library of a single user account, the content queue 330 may include queue entries 332A-C that reference content from the library of any user account registered with the electronic device 110. In this manner, users in a household with user accounts registered with the electronic device 110 can readily add content from their content libraries to the same content queue 330, providing facilitated access to all content libraries of users registered with the electronic device 110, such as all users in the same home.

Figure 4:
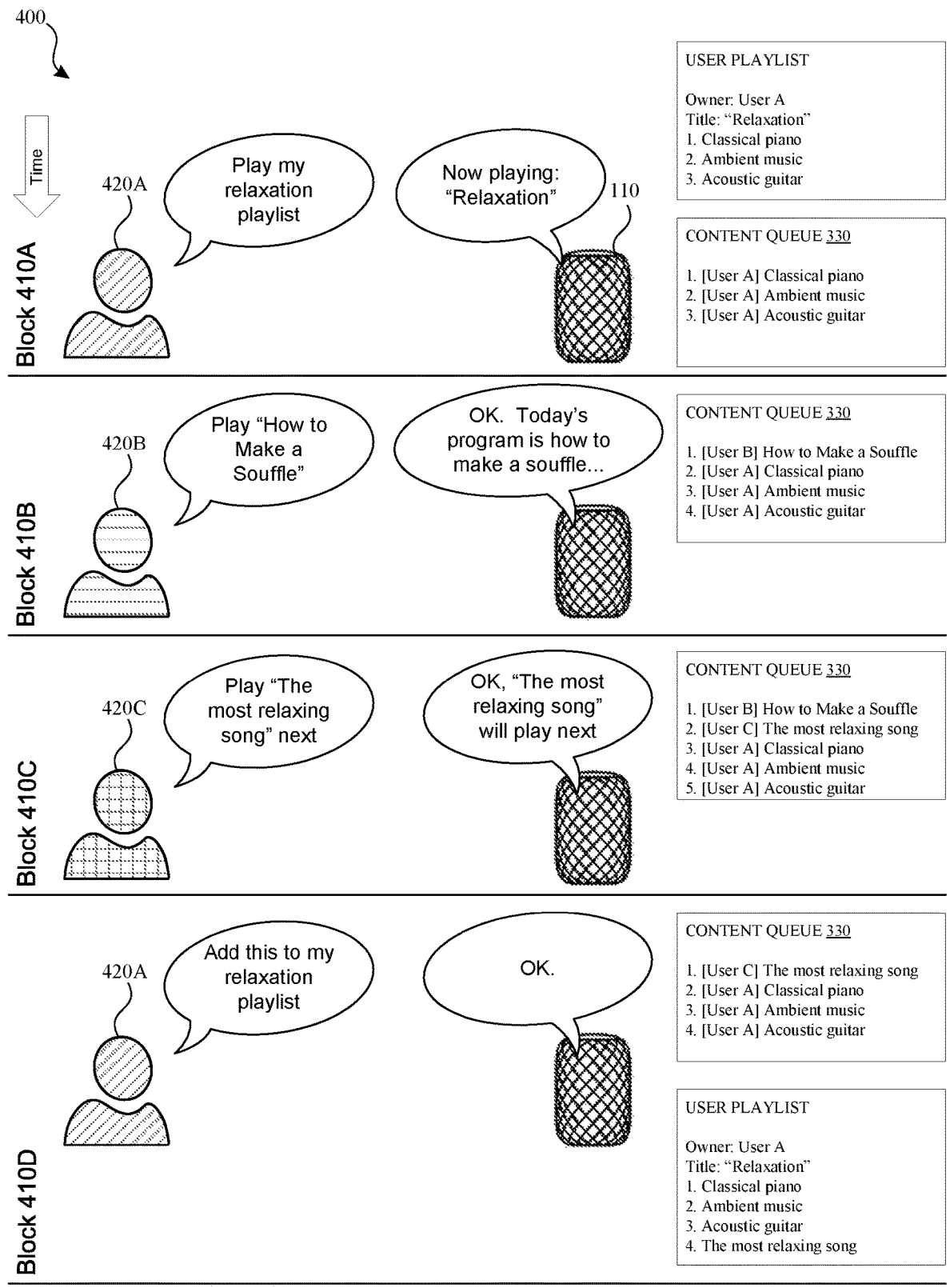
FIG. 4 illustrates an example process flow of utilizing a multi-user content queue in accordance with one or more implementations.

FIG. 4 illustrates an example process flow 400 of utilizing a multi-user content queue in accordance with one or more implementations. For explanatory purposes, the process flow 400 is primarily described herein with reference to the electronic device 110, and the servers 114-118 of FIG. 1. However, the process flow 400 is not limited to the electronic device 110, and the servers 114-118 of FIG. 1, and one or more blocks (or operations) of the process flow 400 may be performed by one or more other components and/or other suitable devices (e.g., any of the electronic devices 102-110). Further for explanatory purposes, the blocks of the process flow 400 are described herein as occurring in serial, or linearly. However, the blocks of the process flow 400 need not be performed in the order shown and/or one or more blocks of the process flow 400 need not be performed and/or can be replaced by other operations.

In the example of FIG. 4, the electronic device 110 may correspond to a device associated with a user account of a first user, or user 420A, e.g., named "Alison". Alison may reside in or be a guest of a home/residence (hereinafter "home") that is also the home of a second user, or user 420B, e.g., named "Bob". User 420C, e.g. named "Chris" may also reside in the same home.

The electronic device 110 may correspond to a device associated with Bob's user account, and may be connected to a local area network of the home. The user accounts of the Chris and Alison may also be registered to the electronic device 110. In one or more implementations, users in the same home, e.g. Alison, Bob, and Chris may interact with the electronic device 110 (e.g., via voice control, or by a remote control application, control application or virtual assistant application running on electronic devices 102-108) in order to access and/or output content (e.g., music from Alison, Bob, and Chris' online content libraries) via the electronic device 110.

The process flow 400 may begin at block 410A, where user 420A provides the voice command, "Play my relaxation playlist." For simplicity, wake words may be omitted from the examples shown in FIG. 4. The electronic device 110 may confirm the voice command by inserting the user playlist into the content queue 330, as shown. For example, referring to FIG. 1, the voice command may be compared to voice profiles of the users 420A-C that are locally stored on the electronic device 110 to identify the user 420A.

The electronic device 110 may then transmit the query, the locally stored user account credentials, and/or a user account identifier corresponding to the user 420A to a server, such as the content server 114 and/or an intermediary server such as a virtual assistant server. The content server 114 may search the content libraries corresponding to the user account credentials to find the playlist of the user 420A matching the description of "relaxation" as indicated in the voice command.

The content server 114 may transmit a content identifier corresponding to the playlist in the content library of the user 420A, as well as a user account identifier corresponding to the user 420A to the electronic device 110. The electronic device 110 may receive the content identifier and the user account identifier and may retrieve the network identifier corresponding to the user playlist from the content library information 312A, and may add queue entries for the content of the playlist to the content queue 330, e.g. in association with the user account identifier and/or other information for accessing the user account credential corresponding to the user account of the user 420A. Thus, when an audio player application executing on electronic device 110 processes the content queue 330, the audio player can readily retrieve the network identifier from the corresponding content library information and can retrieve the corresponding content item from the content server 114 using the corresponding user account credential.

Further, as an optional feature, electronic device 110 may allow one or more of the users 420A-C to specify whether their own playback from their own content libraries via the electronic device 110 should be recorded to affect, e.g. their musical preferences and recommendations. Thus, the queuing of user playlist may be noted in the playback history of user 420A, and the playback of the content may affect the user's musical preference profile for providing tailored musical recommendations and other features. This may be limited to only actions carried out specifically by each user and for content owned in each user's library. Thus, users 420B-420D queuing their own music will not affect the profile of user 420A, and vice versa.

On the other hand, an individual user may still perform profile affecting actions with content that is not specifically authorized to that individual user. For example, while a song authorized to a different user is playing, a user may indicate that the user "likes" the song, and this may be taken into account in the user's musical preferences even though the user may not have library access to that song.

At block 410B, user 420B requests playback of media content titled "How to Make a Souffle." Using a process similar to that described in block 410A, electronic device 110 may identify the speaker as user 420B, and the requested content can be added to the top of content queue 330 for immediate playback. Since the previous "Classical piano" track may have been still playing, it may be pushed down in the content queue 330, and resumed or restarted when the "How to Make a Souffle" program finishes.

At block 410C, user 420C may request a song, or "The most relaxing song" to be queued onto the content queue 330. The content queue 330 may be updated as shown, whereas the current media content, or "How to Make a Souffle" continues playing, but the next media content is updated to reference the requested song, or "The most relaxing song."

At block 410D, user 420A may request the currently playing song, or "The most relaxing song," to be added to a specific playlist owned by the user, or the user playlist titled "Relaxation" and owned by user 420A. As shown in block 410D, user playlist may be updated such that "The most relaxing song" is added. For example, assuming both the user 420A and the user 420C have access to the song, such as through a music subscription. Further, the updated user playlist may be provided as a push update to all registered devices of the user 420A.

Figure 5:
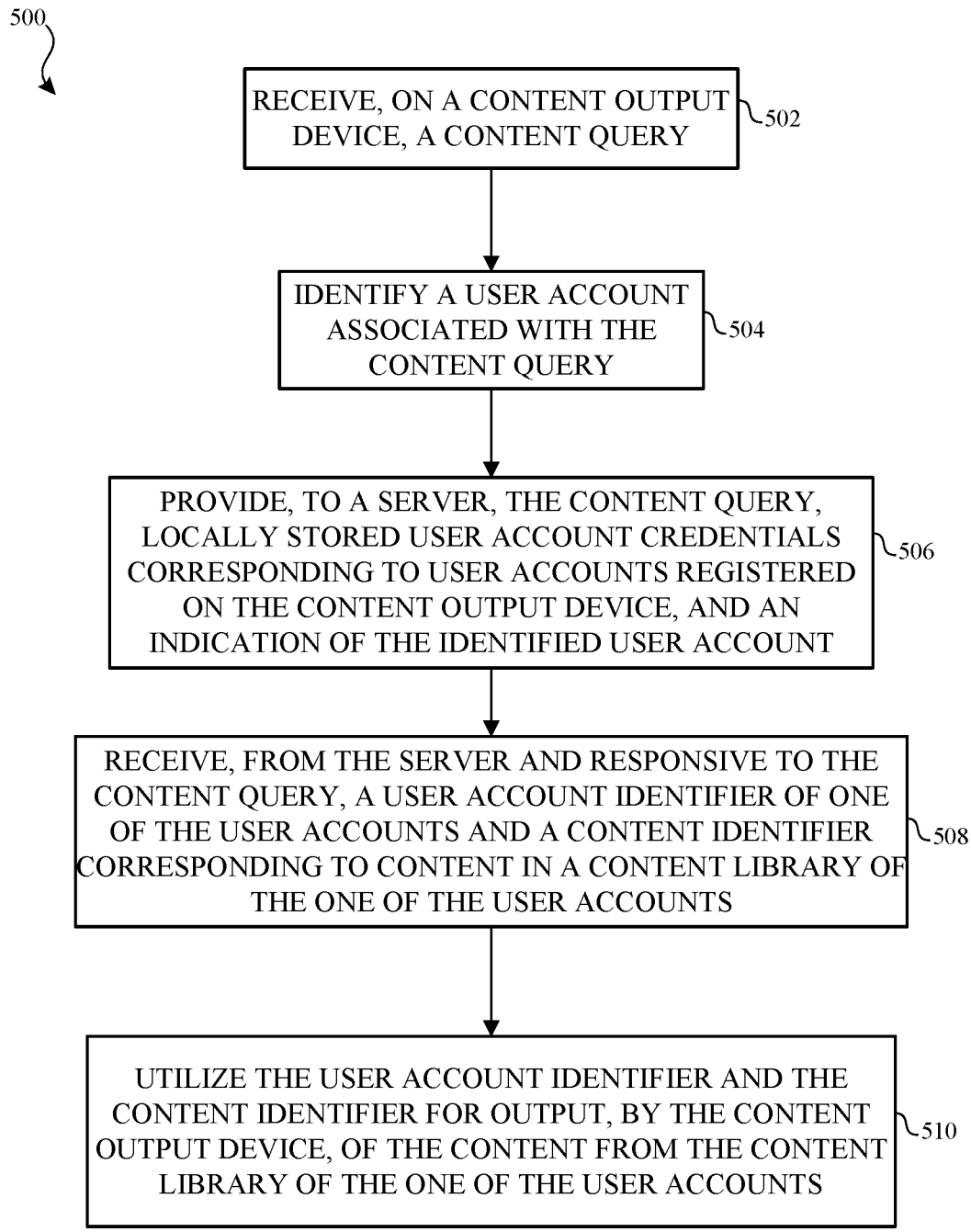
FIG. 5 illustrates a flow diagram of an example process for searching for content via a multi-user content output device in accordance with one or more implementations.

FIG. 5 illustrates a flow diagram of an example process for searching for content via a multi-user content output device in accordance with one or more implementations. For explanatory purposes, the process 500 is primarily described herein with reference to the electronic device 110 and the content server 114 of FIG. 1. However, the process 500 is not limited to the electronic device 110 and/or the content server 114 of FIG. 1, and one or more blocks (or operations) of the process 500 may be performed by one or more other components and/or other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The process 500 begins when a content output device, such as the electronic device 110, receives a content query (502). The content query may be, for example, a voice command that is provided to the electronic device 110. The content output device, such as the electronic device 110, identifies a user account associated with the content query (504). For example, the electronic device 110 may match the voice command corresponding to the content query to a voice profile of a user account registered with the electronic device 110.

The content output device, such as the electronic device 110, provides, to a server, such as the content server 114 (and/or an intermediary virtual/voice assistant server), the content query, locally stored user account credentials 322A-C corresponding to user accounts registered on the content output device, and an indication of the identified user account (506). As is discussed further with respect to FIG. 7, the content server 114 may use the content query to search the content libraries corresponding to the user account credentials with a prioritization being given to the identified user account.

The content output device, such as the electronic device 110, receives, from the server, such as the content server 114, and responsive to the content query, a user account identifier of one of the registered user accounts and a content identifier corresponding to a content item in the one of the registered user accounts (508). In one or more implementations, the content output device may also receive a requesting user account identifier corresponding to the identified user account (506).

The content output device, such as the electronic device 110, utilizes the user account identifier and the content identifier for output, by the content output device, of the content from the content library from the one of the user accounts (510). For example, the content output device may provide the user account identifier and the content identifier to a music playback application executing on the electronic device 110, such as for immediate playback or for queuing for subsequent playback. For example, the music playback application may add the content identifier, the user account identifier, and/or the requesting user identifier as all or part of an entry to the content queue 330, as is discussed further below with respect to FIG. 6.

Figure 6:
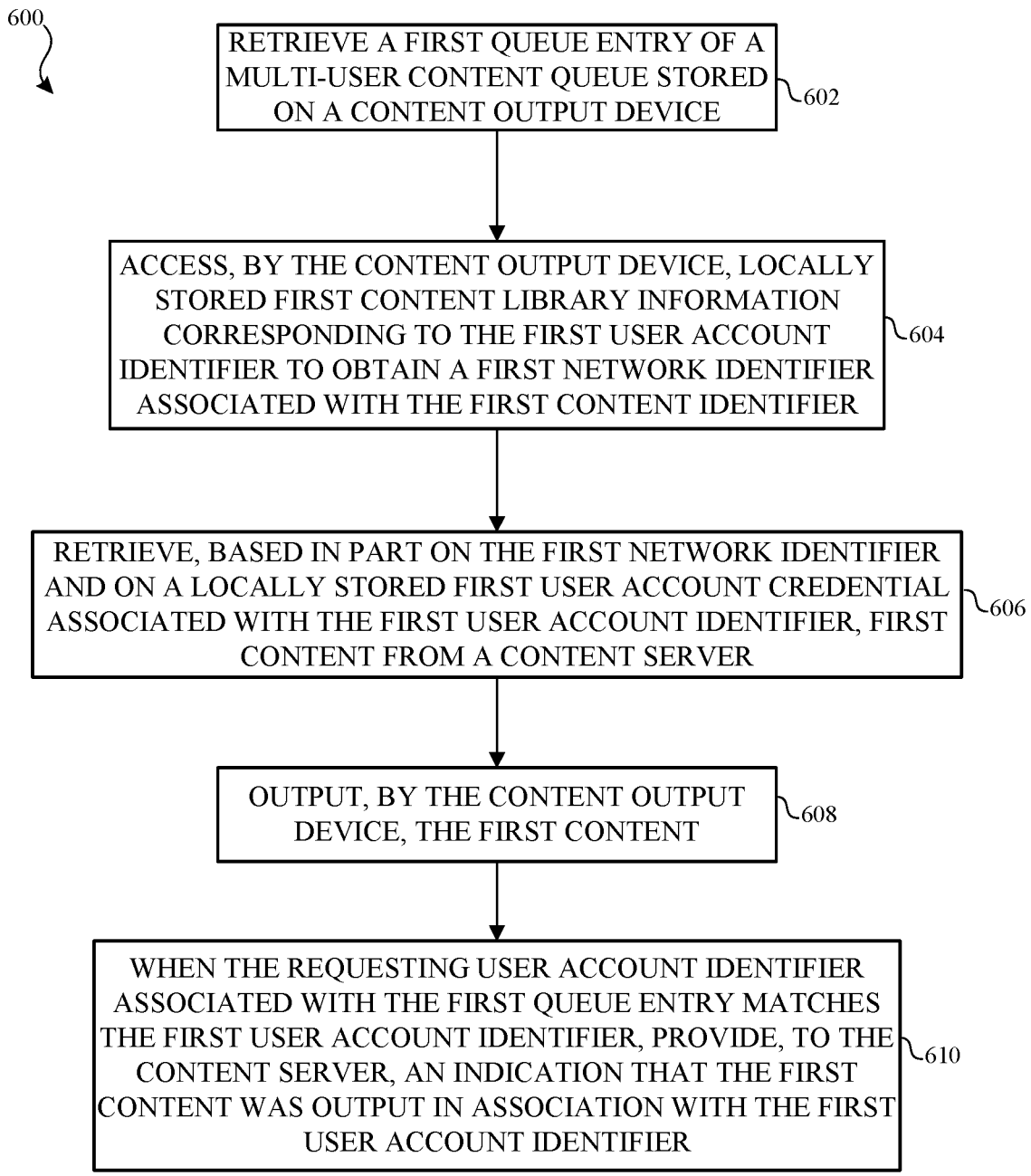
FIG. 6 illustrates a flow diagram of an example process of accessing a multi-user content queue in accordance with one or more implementations.

FIG. 6 illustrates a flow diagram of an example process of accessing a multi-user content queue in accordance with one or more implementations. For explanatory purposes, the process 600 is primarily described herein with reference to the electronic device 110 and the content server 114 of FIG. 1. However, the process 600 is not limited to the electronic device 110 and/or the content server 114 of FIG. 1, and one or more blocks (or operations) of the process 600 may be performed by one or more other components and/or other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The process 600 may begin when a content output device, such as the electronic device 110, retrieves a first queue entry of a multi-user content queue 330 stored on the content output device for output (602). The first queue entry may include, for example, a first user account identifier of a first user account, a content identifier that identifies a particular content item in a first content library corresponding to the first user account, and/or a requesting user account identifier corresponding to the user who requested that the particular content item be added to the content queue 330.

The content output device, such as the electronic device 110, may access locally stored first content library information 312A corresponding to the first user account identifier to obtain a first network identifier associated with the first content identifier in the first content library information 312A (604). The content output device, such as the electronic device 110, may retrieve, based at least in part on the first network identifier and on a locally stored user account credential associated with the first user account identifier, first content from the content server 114 (606). For example, the electronic device 110 may pass the first network identifier and the first user account credential to the content server 114, and the content server 114 may provide, and/or stream, the first content to the electronic device 110.

The content output device, such as the electronic device 110, may output the first content, such as via a music playback application (608). In one or more implementations, when the requesting user account identifier associated with the first queue entry matches the first user account identifier, the content output device, such as the electronic device 110, may provide, to the content server 114, an indication that the first content was output in association with the first user account identifier (610). The content server 114 may utilize the indication to update content usage history associated with the first user account identifier, such as recently played content. In one or more implementations, users may be allowed to selectively indicate, such as via their own electronic device, whether their content usage history should be updated based on their activity on a multi-user device, such as the content output device.

The content output device, such as the electronic device 110, may then process the second queue entry of the content queue 330, which may include a second content identifier and a second user account identifier that is different than the first user account identifier. In one or more implementations, the content queue 330 may include a third queue entry that may include a network identifier to a third content as well as a third user account identifier that may differ from the first and/or second user account identifiers. For example, the third user account identifier may correspond to a user account that has delegated access to the content output device and therefore the content library information corresponding to the third user account identifier may not be stored on the content output device.

In one or more implementations, the content output device, such as the electronic device 110, may store a current user account identifier corresponding to the user account identifier associated with content being currently accessed, or content about to be accessed. When a queue entry is processed for playback that includes a user account identifier that is different than the current user account identifier, the content output device may switch the current user account identifier to be the user account identifier of the queue entry. The context change associated with changing the current user account identifier may include changing a default content library information referenced in the database 310 and/or changing a default user account credential referenced in the user account credentials data store 320. Thus, the content output device may change the current user account identifier each time a queue entry is processed for playback with a different user account identifier.

In one or more implementations, the content queue 330 may be transferred between the electronic devices 102-110. For example, a user may initiate a transfer via a user interface on one of the electronic devices 102-110, and/or a transfer may be initiated by a particular physical action associated with one or more of the electronic devices, such as physically bumping or tapping one of the electronic devices on another of the electronic devices. When the content queue 330 is transferred to another content output device, the other content output device may adjust the content queue 330 based on the user account credentials that are registered with the other content output device.

For example, if a content item in the transferred content queue is from a content library of a user account that is not associated with the other content device, the other content device may determine whether the content item is included in a content library of a user account that is associated with the other content output device. If the content item is included in the content library of a user account that is associated with the other content output device, the other content output device may adjust the queue entry to reference the content library of the user account that is associated with the other content output device. However, if the content item is not included in a content library of a user account that is associated with the other content output device, the other content output device may remove, or hide, the content item from the content queue. In this manner, the content item will not appear in the content queue, however, the content item may be recoverable if the content queue is transferred back to the original device that has access to the content item.

Figure 7:
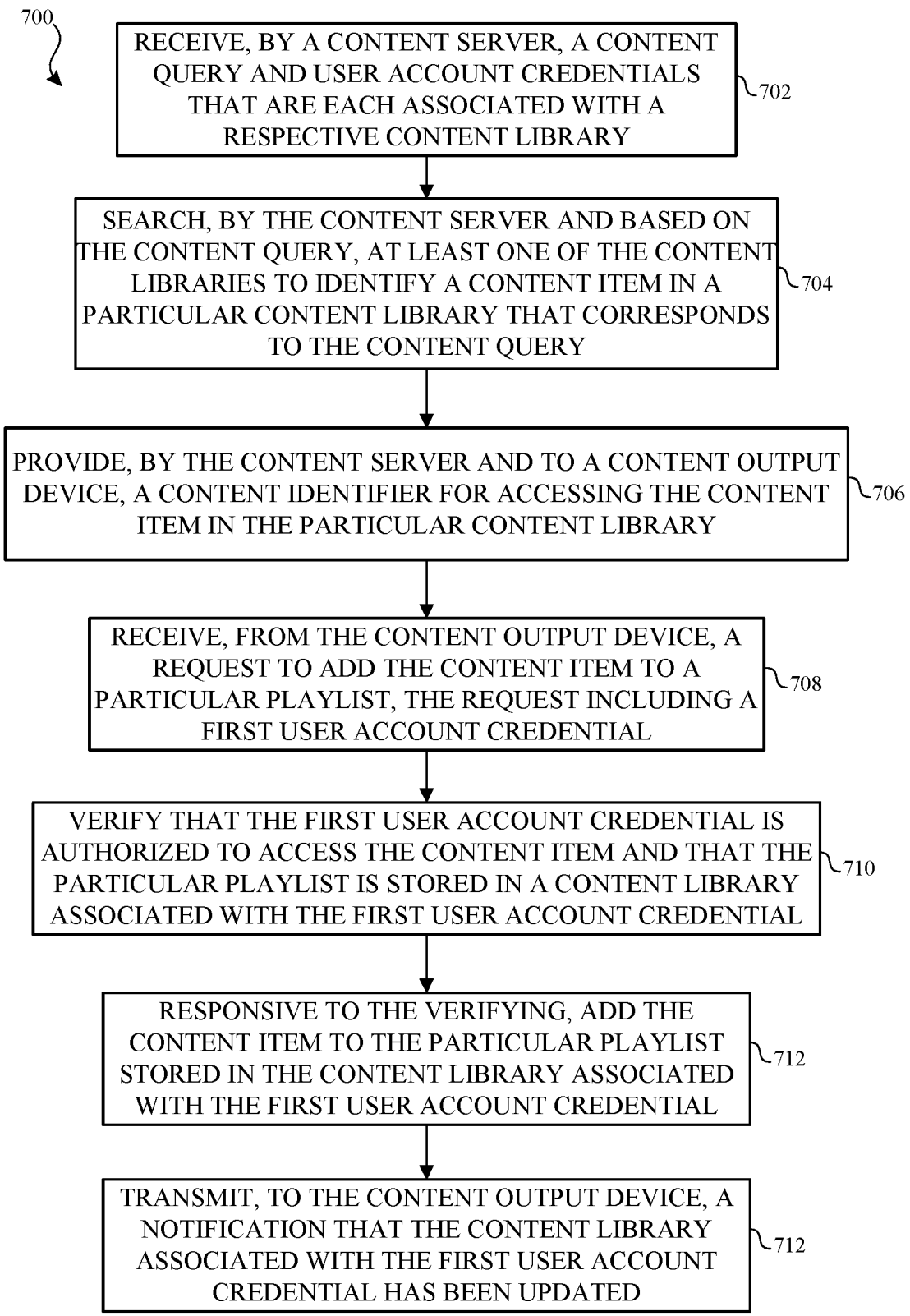
FIG. 7 illustrates a flow diagram of an example process of handling content queries from multi-user content output devices in accordance with one or more implementations.

FIG. 7 illustrates a flow diagram of an example process 700 of handling content queries from multi-user content output devices in accordance with one or more implementations. For explanatory purposes, the process 700 is primarily described herein with reference to the electronic device 110 and the content server 114 of FIG. 1. However, the process 700 is not limited to the electronic device 110 and/or the content server 114 of FIG. 1, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The example process 700 begins when the content server 114 receives a content query and user account credentials that are each associated with a respective content library of a respective user account (702) from a content output device, such as the electronic device 110. In one or more implementations, the content query and user account credentials may be provided by the electronic device 110 to a voice/virtual assistant server, text corresponding to the content query may be identified by the voice/virtual assistant server, and the text and user account credentials may be passed from the voice/virtual assistant server to the content server 114. The content server 114 may further receive a requesting user account identifier corresponding to the user account that provided the content query.

The content server 114 searches, based on the content query, at least one of the content libraries associated with the user account credentials to identify a content item in a particular content library that corresponds to the content query. For example, if the content server 114 receives a requesting user account identifier, the content server 114 may first search the content library corresponding to the requesting user account identifier for the content query. If the content item is identified in the content library corresponding to the requesting user account identifier, the content server 114 may stop searching for the content query. However, if the content item is not identified in the content library corresponding to the requesting user account identifier, the content server 114 may search one or more additional content libraries of corresponding to the remaining user account credentials.

The content server 114 may provide to a content output device, such as the electronic device 110, a content identifier for accessing the content item in the particular content library (706). In one or more implementations, the content server 114 may further provide a user account identifier corresponding to the particular content library and/or a requesting user account identifier corresponding to the user account that requested the content item. The content output device may responsively playback the content item and/or queue the content item in a content queue 330.

The content server 114 may subsequently receive, from the content output device, such as the electronic device 110, a request to add the content item to a particular playlist, where the request includes a first user account credential corresponding to the user account that is requesting to add the content item to the particular playlist (708). The content server 114 verifies that the first user account credential is authorized to access the content item, and that the particular playlist is stored in a content library associated with the first user account credential (710). Responsive to the verifying, the content server 114 adds the content item to the particular playlist store din the content library associated with the first user account credential, such as by using the first user account credential to modify the particular playlist (712).

The content server 114 transmits, to the content output device, such as the electronic device 110, a notification that the content library associated with the first user account credential (and/or the first user account identifier) has been updated (712). The content output device may responsively retrieve an update to the content library information corresponding to the first user account credential. In one or more implementations, a process similar to that described in blocks 708-712 may be performed to add the content item to the content library associated with the first user account credential, e.g. instead of adding the content item to the particular playlist.

As described above, one aspect of the present technology is the gathering and use of data available from specific and legitimate sources for outputting media content. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for outputting content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
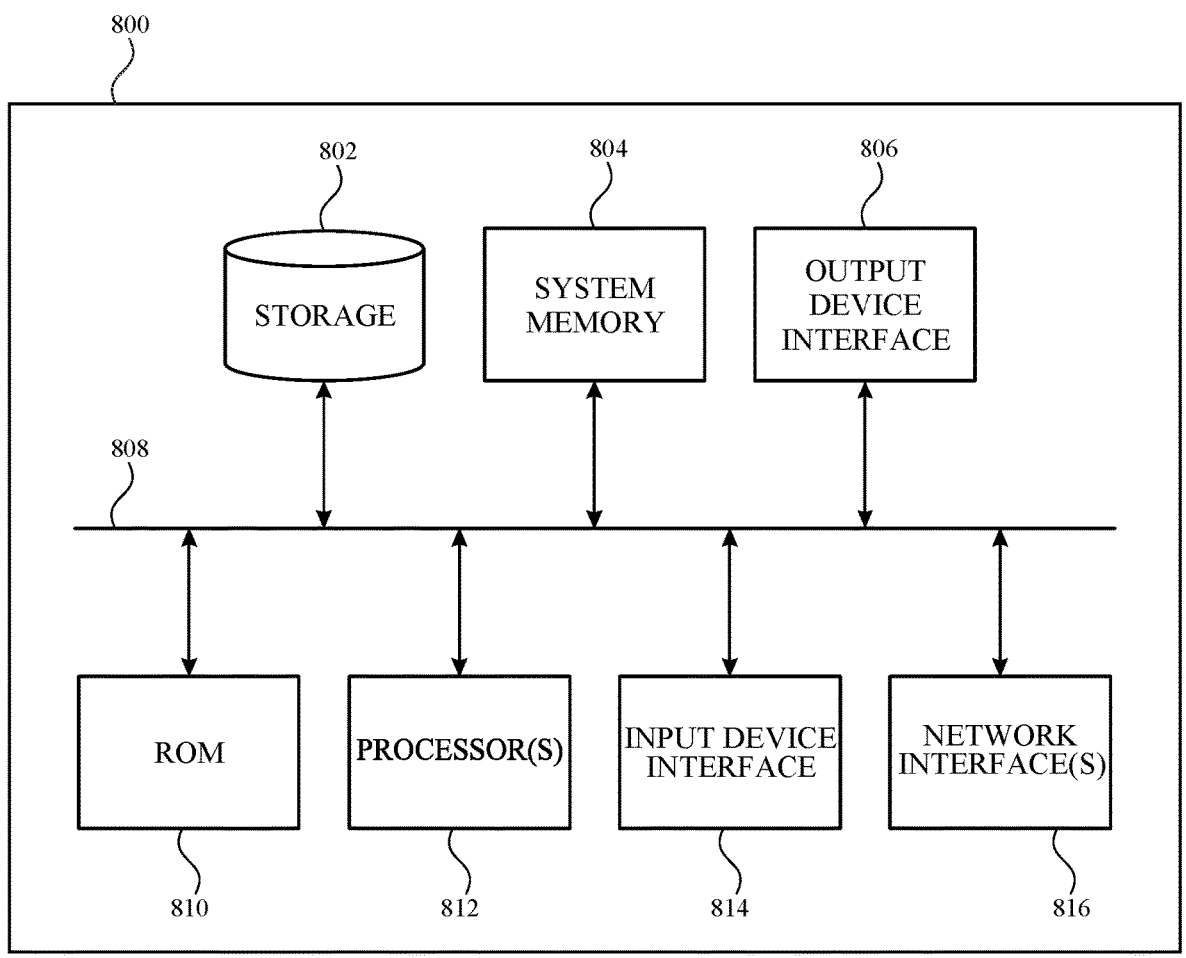
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-110, and/or one or the servers 114-118 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as one or more of the servers 114-118 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
    a memory; and
    at least one processor configured to:
        receive, on the device, a content query;
        retrieve, from the memory, a plurality of user account credentials corresponding to a plurality of user accounts associated with the device;
        provide, to a server, the plurality of user account credentials and the content query;
        receive, from the server and based on the content query, a user account identifier of one of the plurality of user accounts and a content identifier corresponding to content in a content library of the one of the plurality of user accounts; and
        utilize the user account identifier and the content identifier for output, by the device, of the content from the content library of the one of the plurality of user accounts.

2. The device of claim 1, wherein the at least one processor is configured to utilize the user account identifier and the content identifier for output, by the device, of the content from the content library of the one of the plurality of user accounts by:
    providing, to a content output application executing on the at least one processor, the user account identifier and the content identifier for output of the content by the device.

3. The device of claim 1, wherein the at least one processor is further configured to:
    determine a requesting user account identifier associated with the content query; and
    provide, to the server, an indication of the requesting user account identifier associated with the content query in conjunction with providing the plurality of user account credentials and the content query to the server.

4. The device of claim 3, wherein the content query comprises a voice query and the at least one processor is configured to determine the requesting user account identifier associated with the content query by:
    identifying a voice profile that matches the voice query; and
    determining the requesting user account identifier based at least in part on the identified voice profile.

5. The device of claim 3, wherein the requesting user account identifier differs from the user account identifier received from the server.

6. The device of claim 1, wherein the at least one processor is further configured to:
    prior to receipt of the content query, store, in the memory, the plurality of user account credentials and respective content library information corresponding to a respective content library associated with each of the plurality of user account credentials.

7. The device of claim 6, wherein the at least one processor is further configured to:
    register each of the plurality of user accounts on the device, wherein each of the plurality of user account credentials and the respective content library information are stored on the device responsive to registering each of the plurality of user accounts.

8. The device of claim 1, wherein the content comprises a user generated playlist stored in the content library of the one of the plurality of user accounts.

9. A non-transitory machine-readable medium comprising code that, when executed by one or more processors, causes the one or more processors to execute operations, the code comprising:
    code to retrieve, by a content output device, a first queue entry of a multi-user content queue stored on the content output device, the first queue entry comprising a first user account identifier and a first content identifier, wherein the multi-user content queue further comprises a second queue entry comprising a second user account identifier and a second content identifier, the second user account identifier differing from the first user account identifier;
    code to access, by the content output device, locally stored first content library information corresponding to the first user account identifier to obtain a first network identifier associated with the first content identifier;

code to retrieve, based at least in part on the first network identifier and a locally stored first user account credential associated with the first user account identifier, first content from a content server;

code to output, by the content output device, the first content;

code to retrieve, by the content output device, the second queue entry from the multi-user content queue stored on the content output device;

code to access, by the content output device, locally stored second content library information corresponding to the second user account identifier to obtain a second network identifier associated with the second content identifier, the second content library information differing from the first content library information;

code to retrieve, based at least in part on the second network identifier and a locally stored second account credential associated with the second user account identifier, second content from the content server, the locally stored second account credential being different than the locally stored first user account credential; and outputting, by the content output device, the second content.

10. The non-transitory machine-readable medium of claim 9, wherein the second content is the same as the first content and the first content identifier differs from the second content identifier.

11. The non-transitory machine-readable medium of claim 9, wherein the code further comprises:

code to retrieve, by the content output device, a third queue entry from the multi-user content queue stored on the content output device, the third queue entry comprising a third user account identifier and a third network identifier; and code to retrieve, based at least in part on the third network identifier and a locally stored third account credential associated with the third user account identifier, third content from the content server; and code to output, by the content output device, the third content.

12. The non-transitory machine-readable medium of claim 9, wherein the first queue entry further comprises a first requesting user account identifier corresponding to a user account that requested output of the first content.

13. The non-transitory machine-readable medium of claim 12, wherein the code further comprises:

code to, when the first requesting user account identifier matches the first user account identifier, provide, to the content server, an indication that the first content was output by the content output device in association with the first user account identifier for updating a content history associated with the first user account identifier.

14. The non-transitory machine-readable medium of claim 13, wherein the code further comprises:

code to, when the first requesting user account identifier does not match the first user account identifier, forego providing, to the content server, the indication that the first content was output by the content output device.

15. The non-transitory machine-readable medium of claim 9, wherein the code further comprises:

code to receive a request to add the first content to a second content library corresponding to the second content library information associated with the second user account identifier, the request being associated with the second user account identifier;

code to retrieve the locally stored second user account credential; and code to provide, to the content server, the locally stored second user account credential and the request to add the first content to the second content library.

16. The non-transitory machine-readable medium of claim 15, wherein the code further comprises:

code to receive, from the content server and responsive to providing, to the content server, the locally stored second user account credential and the request to add the first content, a notification that the second content library has been updated; and code to retrieve, from the content server and responsive to receipt of the notification, an update to the locally stored second content library information.

17. A method comprising:

receiving, by a content server and from a user device, a content query and a plurality of user account credentials, each respective user account credential being associated with a respective content library of a plurality of content libraries, and the plurality of user account credentials corresponding to a plurality of user accounts associated with the user device;

searching, by the content server and based on the content query and the plurality of user account credentials from the user device, at least one of the plurality of content libraries to identify a content item in a particular content library of the plurality of content libraries that corresponds to the content query; and providing, by the content server and to the user device, a content identifier for accessing the content item in the particular content library of the plurality of content libraries.

18. The method of claim 17, wherein the receiving further comprises receiving a requesting user account identifier corresponding to a first user account credential of the plurality of user account credentials, and the searching comprises:

prioritizing a first content library of the plurality of content libraries over other content libraries of the plurality of content libraries, the first content library corresponding to the requesting user account identifier and first user account credential.

19. The method of claim 18, further comprising:

receiving a request to add another content item from another content library of the plurality of content libraries to the first content library of the plurality of content libraries, the request comprising the first user account credential;

verifying that the first user account credential is authorized to access the other content item; and when the first user account credential is authorized to access the other content item, adding the other content item to the first content library of the plurality of content libraries, otherwise forgoing adding the other content item to the first content library of the plurality of content libraries.

20. The method of claim 18, further comprising:

receiving a request to add another content item from another content library of the plurality of content libraries to a particular playlist, the request comprising the first user account credential;

verifying that the first user account credential is authorized to access the other content item and that the particular playlist is stored in the first content library; and when the first user account credential is authorized to access the other content item and the particular playlist is stored in the first content library, adding the other content item to the particular playlist stored in the first content library, otherwise forgoing adding the other content item to the particular playlist stored in the first content library.

\* \* \* \* \*

UNITED STATES PATENT AND TRADEMARK OFFICE
CERTIFICATE OF CORRECTION

PATENT NO. : 11,995,116 B2
APPLICATION NO. : 17/064462
DATED : May 28, 2024
INVENTOR(S) : Cody D. Jorgensen et al.

It is certified that error appears in the above-identified patent and that said Letters Patent is hereby corrected as shown below:

On the Title Page

Under item (56) References Cited; OTHER PUBLICATIONS:
Please replace: "Extended European Scarch Report" with: --Extended European Search Report--.

Signed and Sealed this
Thirteenth Day of August, 2024

Katherine Kelly Vidal
*Director of the United States Patent and Trademark Office*